Dec. 20, 1966     S. JAYE ETAL     3,293,135
NUCLEAR REACTOR FUEL
Original Filed July 20, 1964     2 Sheets-Sheet 1
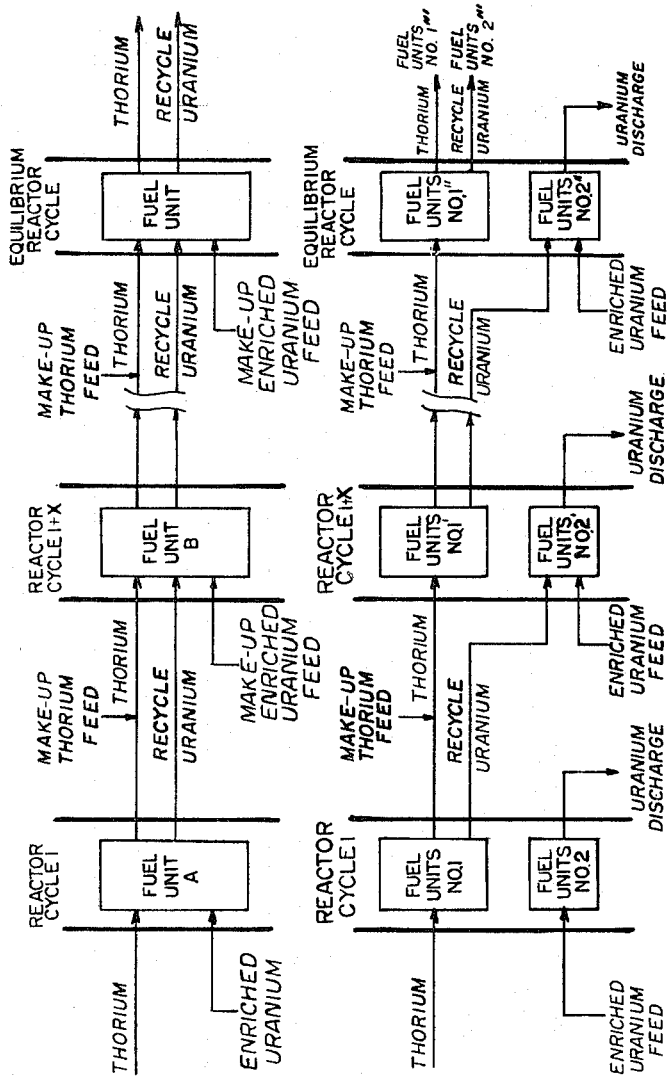
INVENTORS
SEYMOUR JAYE
DANA H. LEE JR.
BY
ATTORNEY Dec. 20, 1966  S. JAYE ETAL  3,293,135
NUCLEAR REACTOR FUEL
Original Filed July 20, 1964  2 Sheets-Sheet 2
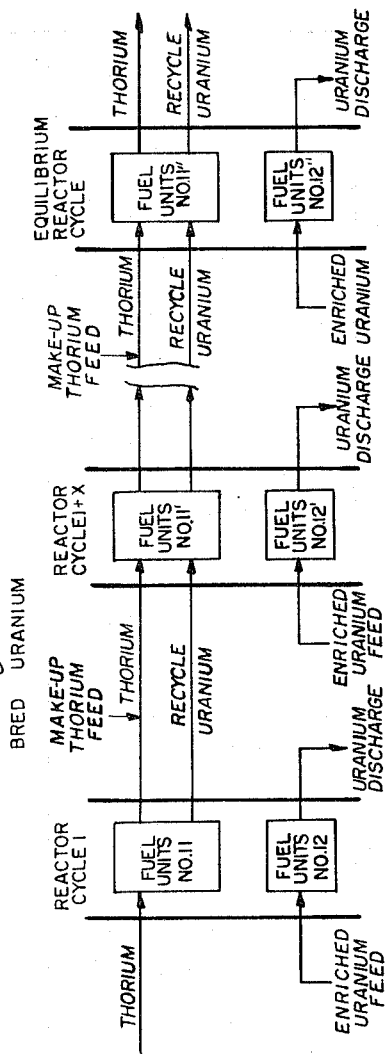
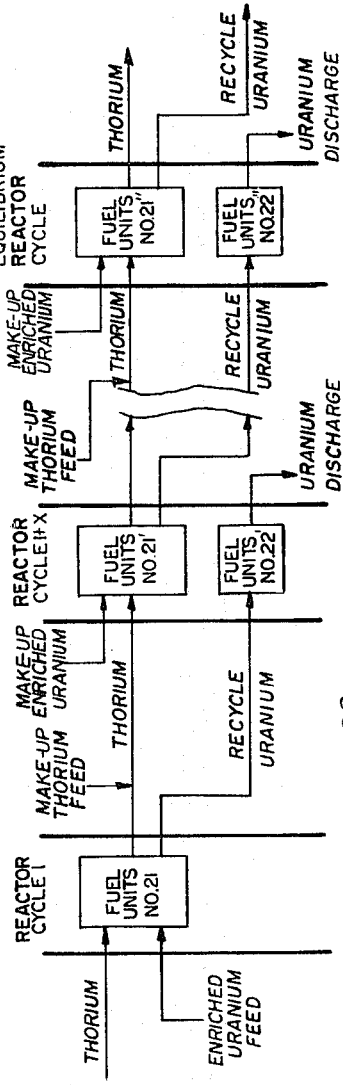
INVENTORS
SEYMOUR JAYE
DANA H. LEE Jr.
BY
ATTORNEY United States Patent Office 3,293,135
Patented Dec. 20, 1966

3,293,135
NUCLEAR REACTOR FUEL
Seymour Jaye, Solana Beach, and Dana H. Lee, Jr., Del Mar, Calif., assignors, by mesne assignments, to the United States of America as represented by the United States Atomic Energy Commission
Original application July 20, 1964, Ser. No. 384,012, now Patent No. 3,208,912, dated Sept. 28, 1965. Divided and this application July 30, 1965, Ser. No. 509,655
1 Claim. (Cl. 176—17)

This is a division of application Serial No. 384,012 filed July 20, 1964, now U.S. Patent 3,208,912, issued September 28, 1965.

This invention relates to nuclear reactors, and more particularly it relates to the operation of a nuclear reactor utilizing a thorium-uranium$^{233}$ breeding cycle.

In power reactors which are designed to produce useful power, as for example steam for the generation of electricity, the cost of nuclear fuel plays an important part in the economics of reactor operation. Because of the relatively high cost of nuclear fuels, considerable interest has fairly recently been paid to power-breeder reactors. These reactors, in addition to producing useful power, simultaneously produce fissionable material from fertile material.

The ratio of fissionable atoms created from the fertile material for each fissionable atom consumed in a nuclear reactor is termed the conversion ratio of the reactor. If a reactor had a conversion ratio of 1.0, it would produce as much new fissionable material as it would use and would be termed a breeder. Theoretically, apart from many practical considerations, such a reactor could operate for extremely long periods using only enough fissionable material for initial start-up and a large supply of fertile material. Because fertile material is a relatively inexpensive commodity, such a reactor would be economically of great value.

Under favorable conditions, the fissioning of fissionable materials $U^{233}$, $U^{235}$ and $Pu^{239}$ produce an average of more than two neutrons for every fissionable atom which is consumed. Because only one neutron is needed to propagate a self-sustaining nuclear reaction, power-breeder reactors using these nuclear fuels can potentially produce as much fissionable fuel as they burn.

The thorium-uranium$^{233}$ fuel cycle appears especially promising for power-breeder reactor operation. Naturally occurring thorium is in the form of isotope $Th^{232}$. This isotope is fertile, having a high tendency to capture a neutron and become thorium-233. $Th^{233}$ decays by two successive beta particle emissions to become $U^{233}$. $U^{233}$ is fissionable and is considered excellently suited for the propagation of the power-breeding cycle. $U^{233}$ has a very high fission cross section to neutrons in the thermal and epithermal range. Moreover, when a $U^{233}$ atom is consumed, an average of about 2.27 neutrons are produced, thus providing an average of 1.27 neutrons per fissionable atom consumed for potentially causing transmutation of another fertile thorium atom into a fissionable atom.

In advanced reactor systems which are capable of operating on the thorium-uranium fuel breeeding cycle, the energy produced in the reactor comes principally from the fission of atoms of $U^{233}$. One example of a reactor type capable of being designed so as to operate in the manner contemplated by the present invention is a high temperature, graphite moderated, gas-cooled reactor system. One embodiment of such a system is described in Nucleonics, volume 18, No. 1, January 1960. In such a reactor system, it is desirable to use as many of the excess neutrons as possible to produce additional $U^{233}$ from the thorium.

To produce as high a conversion ratio in a nuclear reactor as possible, it is important to reduce to the lowest practical values the various undesirable factors which decrease the neutron population of the reactor and thereby reduce the conversion ratio. Losses in the neutron population and consequent decrease in the potential neutrons available to convert fertile atoms to fissile ones result from the following factors: escape or leakage from the reactor core, capture by the material which constitutes the moderator, capture by the heavy nuclides $U^{236}$ and $Np^{237}$, capture by protactinium-233 (an intermediate in the production of $U^{233}$ from $Th^{232}$), capture by volatile and non-volatile fission products and capture by control rods and metal protective coverings. Capture by heavy nuclides becomes an increasingly greater problem as the fuel in a reactor is recycled.

For a nuclear reactor operating in the thermal and epithermal range, $U^{233}$ is preferred as a fuel over $U^{235}$ because the number of neutrons released per fissile nuclide destroyed ($\eta$) is significantly larger for $U^{233}$ than for $U^{235}$. However, because $U^{233}$ is not available naturally, the initial reactor charge usually contains a naturally occurring element, such as $U^{235}$. Futhermore, because conversion ratios as high as unity (1.0) have not yet been economically achieved in power-breeder reactors, some make-up enriched uranium must also be added periodically during the operating life of the reactor.

A power reactor is generally operated no longer than the efficient life of the fuel within it, i.e., until the excess reactivity of the reactor core drops to an undesirably low level. At this time, the fuel elements are removed from the reactor core and replaced with fresh fuel elements. Alternately, a certain selected portion or percentage of the total fuel elements in the core may be removed each year, or other suitable time period, so that the reactor is periodically refueled without any major shutdown to refuel the entire core.

When fuel elements are removed from the reactor, they are generally reprocessed to chemically separate the uranium from the thorium, the fission products, the diluent and the cladding (if present). The separated uranium is available to be refabricated into new fuel elements and subsequently recycled in the same reactor core or in another reactor. For example, if the maximum efficient life of certain fuel elements for a reactor operating on a thorium-uranium fuel cycle is considered to be about 6 years, then one-sixth of the elements might be removed each year and replaced. The nonfissioned uranium and the uranium bred in the thorium, which are recovered by reprocessing, might be refabricated into new fuel elements to replace the fuel elements to be removed from the reactor the following year.

In order to keep fabrication costs at a reasonably low level, it is often planned that the operating life of the fuel element will be equal to the period of power generation it takes for at least about 90 percent of the fissile nuclides originally in the fuel elements to undergo nuclear reactions. Therefore, at the end of the planned life span of a fuel element operating on a thorium-uranium fuel cycle, less than 10 percent of the original $U^{235}$ will remain as that isotope. Thus, the majority of the fissile uranium which is recovered in reprocessing consists of $U^{233}$ which was bred from the fertile thorium in the reactor core. Because conversion factors as great as 1.0 are not yet achieved in power-breeder reactors, some make-up enriched uranium is added to the reprocessed uranium so that the refabricated fuel elements each contain the desired amount of fissile material.

As the reactor is continually operated for repeated fuel cycles and fresh $U^{235}$ is added to maintain the desired reactivity level within the reactor core, the concentration of heavy nuclides, i.e., $U^{236}$ and $Np^{237}$, increases in the reactor core because the $U^{236}$ cannot be separated chemically from the desirable $U^{233}$. Accordingly, the parasitic neutron absorptions associated with these heavy nuclides further and further reduce the conversion ratio of the reactor. Therefore, limitation of the build-up of these heavy nuclide poisons is desirable.

It is a principal object of the present invention to provide an efficient operating nuclear reactor utilizing a thorium-uranium fuel cycle. It is another object to provide a method of fuel management for a nuclear reactor which prevents any substantial build-up of heavy nuclide poisons in the reactor core. It is a further object to provide a method for operating a powder-breeder, or near breeder, nuclear reactor to reduce the average cost of power by increasing the conversion ratio. It is a still further object to provide a method of fuel management for a nuclear reactor utilizing a fuel configuration that facilitates provision of the above objects. These and other objects of the invention are more particularly set forth in the following detailed description and in the accompanying drawings wherein:

FIGURE 1 is a diagrammatic view of a prior art method of managing fuel for a nuclear reactor;

FIGURE 2 is a diagrammatic view of a method of managing fuel for a nuclear reactor embodying various features of the present invention;

FIGURE 3 is a diagrammatic view of an alternate method to that shown in FIGURE 2; and FIGURE 4 is a diagrammatic view of another alternate method to that shown in FIGURE 2.

It has been found that by segregating the fertile thorium from at least part of the enriched uranium fuel in a nuclear reactor utilizating a thorium-uranium fuel cycle, heavy nuclide poisons can be easily, periodically removed, and the build-up of heavy nuclide parasitic neutron absorbers can be kept at an acceptively low level. The fertile thorium is preferably segregated from the fissile enriched uranium in the initial loading of a nuclear reactor operating on this fuel cycle and may be segregated in subsequent reactor loadings when make-up enriched uranium is used. At the end of the planned operative life of a fuel element, the segregation of the fuel facilitates the separation of the $U^{233}$ bred during the reactor cycle from the nonfissioned uranium $U^{233}$ and $U^{235}$ contained in the fuel at the beginning of the cycle.

The segregation of the fuel can be accomplished in any suitable manner. For example, different fuel units of uranium and of thorium may be placed in separate fuel elements, different fuel units may be placed in separate sections of the same fuel element, or means may be provided for easily separating the different fuel units at a later stage, as by using different size fuel particles or different coatings for the different fuel units. Of course, the different possible methods of fuel segregation pose various engineering problems of heat transfer, power production and generation, fuel element fabrication, etc., which must be considered in terms of an individual type of nuclear reactor to determine the most desirable method of segregation in a specific instance.

Although there is no actual limit to the number of different types of fuel units which may be employed, the practical engineering problems enumerated above multiply when more than two different types are used. Therefore, use of only two different types is preferred. This application, for sake of brevity, hereinafter refers to the employment of only two different types of fuel units.

The preferred method of fuel segregation is accomplished by using nuclear fuel in the form of spheroidal particles below about one millimeter in diameter and by coating particles of one type of fuel with a coating of one material and either not coating particles of the other fuel or coating them with a different material. When this method of fuel segregation is employed, one group of particles, as for instance the uncoated particles, may be chemically dissolved, leaving the other group of coated particles remaining unaffected. Various suitable coating may be used, such as metals, metalloids, metal oxides, metal carbides, metal nitrides, metal silicides, metal chlorides, metal sulfides, etc. Likewise, any suitable coating method can be used, as for example, electrolytic, electrostatic, vapor deposition, polymerization from solution, etc.

Preferably, a coating material is used which also serves as a moderator and is impervious to gaseous fission products. Coating with dense pyrolytic carbon is preferred, and is preferably carried out by vapor decomposition. When one group of fuel particles is coated with pyrolytic carbon and the other group is left uncoated, the uncoated group can be dissolved without affecting the coated particles, as by suitable treatment with concentrated nitric acid.

The heavy nuclide poisons $U^{236}$ and $Np^{237}$ with which this application is concerned are produced when the fissile nuclide $U^{235}$ is contacted by a neutron and captures the neutron instead of fissioning. When the nucleus of a $U^{235}$ atom undergoes a nuclear reaction as a result of contact by a neutron in the thermal or epithermal range, fission occurs about 75 percent of the time and capture of the neutron occurs about 25 percent of the time. Although capture by a $U^{235}$ atom is, of course, detrimental to the neutron population, i.e., because it absorbs a neutron without subsequently releasing energy plus additional neutrons, it is still further detrimental because the result of the capture is the birth of a $U^{236}$ atom. $U^{236}$ is not fissile but instead is a poison which has a fairly high capture cross section for neutrons in this energy range. Accordingly, $U^{236}$ again absorbs a neutron by the capture process, further reducing the neutron population without benefiting the chain reaction. Moreover, this capture produces $U^{237}$, a radioactive isotope which has a half-life of about 6.75 days.

$U^{237}$ decays by beta particle emission to neptunium-237, another undesirable heavy nuclide. $Np^{237}$ also has a relatively high capture cross section for neutrons in this energy range and does not produce a fissionable isotope. Accordingly, when $Np^{237}$ captures a neutron, the neutron population is again reduced without any ensuing benefit. Thus, every time a $U^{235}$ atom captures a neutron instead of fissioning, an undesirable heavy nuclide is formed which potentially results in the loss of two more neutrons from the neutron population of the reactor core. It can be seen that these parasitic absorptions of neutrons reduce the number of potential neutrons which the fertile thorium atoms may capture. This reduction results in a lower conversion ratio for the nuclear reactor.

After the initial reactor cycle in a reactor utilizing a thorium-uranium fuel cycle, the majority of the fissions which occur in the reactor core are those of $U^{233}$ atoms, which are produced from the fertile thorium. Although $U^{233}$ is not entirely free from the production of parasitic heavy nuclides, it is definitely superior to $U^{235}$.

When a $U^{233}$ atom undergoes a nuclear reaction as a result of contact with a neutron in the thermal or epithermal range, fission occurs about 9 times for every time that capture occurs. This is a significant initial advantage over $U^{235}$. However, $U^{233}$ has a further advantage because, when it does capture a neutron, the isotope $U^{234}$ which is formed leads to the production of another fissile atom. $U^{234}$ has a fairly large capture cross section for neutrons in the proposed energy range, and although $U^{234}$ thus depletes the neutron population by neutron capture, it produces the fissionable isotope $U^{235}$, a result far preferable to the subsequent capture by the isotope $U^{236}$.

If fuel which initially contained enriched uranium is reprocessed to remove the lighter fission products and to separate the non-fissioned $U^{235}$, for use in a subsequent reactor cycle, these heavy nuclide poisons remain in the fraction with the $U^{235}$. Accordingly, these poisons are carried over into a future reactor cycle. After a few recycles of fuel, the cumulative amount of these heavy nuclides, $U^{236}$ and $Np^{237}$, becomes quite significant and results in a substantial decrease in the conversion ratio of the reactor. By avoiding such a build-up of parasitic heavy nuclides in the reactor core, the economics of reactor operation are substantially improved. By segregating the enriched uranium from the fertile thorium in different fuel units, the removal of heavy nuclide poisons is facilitated.

In FIGURE 1, a program of fuel management for a nuclear reactor operating on a thorium-uranium fuel cycle is diagrammatically illustrated which is termed the "Full Uranium" recycle. This program is indicative of that contemplated by the prior art. In this program, the thorium and the enriched uranium in the initial charge to the reactor are usually indiscriminately included in the same fuel units.

In any respect, the entire fuel charge is reprocessed as a single mass to separate the uranium from the thorium and from the lighter fission products. Although $Np^{237}$ is chemically separable, $U^{236}$ is not and is carried over with the fissile uranium. The thorium is recovered if desired. Additional make-up enriched uranium is added to the recovered uranium for a subsequent fuel charge. Likewise, either all fresh thorium or make-up fresh thorium plus reprocessed thorium is included in the fuel units to provide the the fertile nuclides for the subsequent cycle of the reactor. This process is repeated at the end of each reactor cycle.

As stated above, the fuel management program shown in FIGURE 1 results in the carry over into future reactor cycles of the parasitic $U^{236}$ nuclides along with the fissile uranium. This growing accumulation of parasitic heavy nuclides causes a significant decrease in the conversion ratio of the power-breeder reactor in later reactor cycles.

In FIGURE 2, a fuel management program embodying various features of the present invention is diagrammatically illustrated which is termed the "Once Through" recycle. In this method of reactor operation, the initial fuel charge to the reactor comprises two groups of segregated fuel units of different composition. Segregation may be by any of several methods including those previously set forth. The group of units labeled fuel units number 1 contain the fertile thorium. The group of units labeled fuel units number 2 contain the enriched uranium.

At the end of the first reactor cycle, either all of the fuel, or preferably a selected portion of both groups of fuel units, is removed from the reactor. The fuel units of group number 1 are suitably separated from the fuel units of group number 2 and are reprocessed separately. The bred uranium in fuel units number 1, produced from the fertile thorium, is primarily $U^{233}$. This bred uranium is separated from the thorium, the neptunium and the fission products and is ready for use in a subsequent reactor cycle. The thorium may also be recovered if desired. Fuel units number 2 are treated to reclaim the fissile uranium which was not consumed during the reactor cycle. This uranium is either sold or is designated for use in a different type of reactor wherein heavy nuclide poisoning is of less consequence.

For the fuel charge for a subsequent reactor cycle, designated $(1+x)$, the uranium which was reclaimed from fuel units number 1, primarily $U^{233}$, is fabricated, together with sufficient make-up enriched uranium to bring the reactivity to the desired level, into a group of fuel units designtaed number 2'. Likewise, fuel units number 1' are fabricated which contain fertile thorium, either fresh thorium or reprocessed thorium, with make-up fresh thorium.

At the end of this subsequent reactor cycle, the reprocessing steps utilized after cycle 1 are repeated. The $U^{233}$ which is produced from the fertile thorium in fuel units 1' is recovered. However, in this "Once Through" recycle, this $U^{233}$ is used in only one subsequent reactor cycle, so all the uranium from fuel units 2' is either sold or used in another type reactor.

In FIGURE 3 another method of fuel management for a power reactor operating on a thorium-uranium fuel cycle is diagrammatically illustrated which is termed the "Bred Uranium" recycle method. In the initial cycle of this method, as in the initial cycle of the "Once Through" method, one group of fuel units, number 11, contains the fertile thorium, whereas another group of fuel units, number 12, contains the enriched uranium. At the end of the first reactor cycle, all or a selected portion of the fuel elements are removed. Reprocessing is carried out in a manner similar to that described above in the "Once Through" method.

To produce fuel elements for a subsequent cycle of the reactor, the uranium (principally $U^{233}$) which has been produced in the fertile thorium is fabricated into fuel units number 11' which also contain the fertile thorium for this subsequent cycle. The make-up enriched uranium is contained in fuel units number 12'. Of course, the amount of enriched uranium in the group of fuel units number 12' is considerably less than the amount of uranium which was contained in the group of fuel units number 12 because, in the subsequent cycle, most of the initial reactivity comes from the $U^{233}$. Thus, only enough enriched uranium is provided so that, together with the recycled fissile uranium, the total amount of fissile atoms in the refabricated fuel elements is equivalent to the initial fissile value of these fuel elements at the beginning of the initial reactor cycle. Reprocessing and refabrication in the same manner is carried out after each subsequent reactor cycle.

One difference between the "Once Through" method shown in FIGURE 2 and the "Bred Uranium" method shown in FIGURE 3 is that, in the latter method, all of the $U^{233}$ produced by the fertile thorium is refabricated over and over again into fuel units for subsequent cycles until it eventually fissions or is otherwise removed during reprocessing. Accordingly, in the "Bred Uranium" recycle method, there is some slight build-up of parasit'c heavy nuclides, i.e., as a result of succeeding neutron capture in $U^{233}$ atoms and capture products. However, this build-up is far less than that which results from the method illustrated in FIGURE 1.

In the "Bred Uranium" method, only approximately 10 percent of the $U^{233}$ fissile atoms, which capture neutrons instead of fissioning, are potential producers of undesirable heavy nuclides. Furthermore, about 75 percent of this 10 percent fraction that capture, later fission as $U^{235}$ atoms, leaving only about 25 percent of the 10 percent fraction to become undesirable heavy nuclides $U^{236}$ and $Np^{237}$. Thus, only about 2.5 percent of the $U^{233}$ atoms which undergo neutronic reactions result in the production of undesirable parasitic heavy nuclides.

This slight disadvantage is counterbalanced by the fact that in the "Bred Uranium" recycle method, less make-up enriched uranium is required than in the "Once Through" method. Furthermore, the uranium which is recovered by reprocessing fuel units number 12' is more valuable than that recovered from units number 2'.

The uranium recovered from processing of the fuel units number 2' in the "Once Through" recycle method contains some radioactive isotope $U^{232}$. This isotope is produced in either of two ways. A $U^{233}$ nucleus may absorb a neutron and subsequently emit two neutrons ($n$, $2n$ reaction), resulting in $U^{232}$. Alternately, $Th^{232}$ may undergo an $n$, $2n$ reaction to produce $Th^{231}$ which emits a beta particle to form $Pa^{231}$; this nuclide may then capture a neutron to form $Pa^{232}$ which subsequently emits a beta particle to form $U^{232}$. $U^{232}$ is not readily separable from $U^{233}$, and although its presence within a nuclear reactor core is not detrimental, it decays by alpha particle emission to form a series of radioactive isotopes, some of which have high gamma radioactivities. Thus, uranium which contains the isotope $U^{232}$ requires greater handling precautions and has a significantly diminished worth.

In FIGURE 4, a further method of fuel management for a power-breeder reactor operating on a thorium-uranium fuel cycle is diagrammatically illustrated. This method is termed the "Twice Through" recycle method. The initial cycle is similar to that shown in FIGURE 1, with any indiscriminate distribution of thorium and enriched uranium being used. At the completion of the initial reactor cycle, all or a selected portion of the fuel units are reprocessed to remove the fission products and recover both the $U^{233}$, bred from the thorium, and the non-fissioned $U^{235}$. The thorium may also be reclaimed, if desired.

In refabrication, fuel units 21' are made which contain the fertile thorium for a subsequent cycle together with the make-up enriched uranium needed. All of the uranium recovered from processing the fuel units 21 from the initial cycle is incorporated into fuel units 22'.

At the end of this subsequent fuel cycle, the two groups of segregated fuel units are separated and reprocessing of each is carried out separately. The uranium which is recovered from fuel units 22' is either sold or used in a different type of reactor. The uranium recovered from fuel units 21' is incorporated into fuel units 22' for a later reactor cycle.

This "Twice Through" recycle, shown in FIGURE 4, is somewhat of an economic compromise between the methods shown in FIGURES 2 and 3. Whereas the "Twice Through" recycle requires less make-up enriched uranium than either of the other methods, it has a lower conversion ratio because the heavy nuclide poisons are allowed to build-up for two reactor cycles rather than being removed after the reactor cycle in which they are born as in the "Once Through" method.

In Table I which follows, data is presented that is representative of the conditions occurring in one type of a high temperature, graphite-moderated reactor using helium as a coolant. The table shows the results of operation of this reactor system on a thorium-uranium fuel cycle, using the methods of fuel management illustrated in FIGURES 1-4. While it is recognized that the actual numerical values are necessarily dependent upon the particular engineering design of the reactor system, the table illustrates the results from the equilibrium reactor cycle (in a situation wherein one-sixth of the elements in the core are removed each year and replaced) and is useful to compare the different methods of fuel management.

TABLE I

|  | Full (Fig. 1) | Once Through (Fig. 2) | Bred Uranium (Fig. 3) | Twice Through (Fig. 4) |
|---|---|---|---|---|
| Average | 2.096 | 2.127 | 2.115 | 2.117 |
| Average conversion ratio | 0.691 | 0.760 | 0.752 | 0.736 |
| Kg. of $U^{235}$ in Feed | 233.7 | 233.7 | 233.7 | 233.7 |
| Kg. of $U^{233}$ recycled | 185.9 | 153.0 | 165.3 | 156.2 |
| Kg. of $U^{235}$ recycled | 298.3 | 7.6 | 23.3 | 21.9 |
| Neutron Absorptions in: |  |  |  |  |
| $Th^{232}$ | 0.611 | 0.710 | 0.676 | 0.686 |
| $U^{234}$ | 0.090 | 0.065 | 0.039 | 0.063 |
| $Pa^{233}$ | 0.010 | 0.015 | 0.013 | 0.014 |
| Fission Products | 0.154 | 0.193 | 0.189 | 0.191 |
| $U^{233}$ | 0.610 | 0.691 | 0.664 | 0.666 |
| $U^{235}$ | 0.390 | 0.309 | 0.336 | 0.334 |
| $U^{236}+Np^{237}$ | 0.118 | 0.021 | 0.030 | 0.042 |
| Kg. of $U^{233}$ discharged | 0 | 6.4 | 0 | 7.0 |
| Kg. of $U^{235}$ discharged | 0 | 19.7 | 12.1 | 9.9 |

Table I illustrates the effectiveness of the methods of fuel management shown in FIGURES 2-4. Compared to the prior art method shown in FIGURE 1, the "Once Through" method reduces the neutron absorptions by the heavy nuclides by a factor of more than 5 (i.e. 0.118 to 0.021). The Bred Uranium recycle method effects a reduction by a factor of about 4, and the "Twice Through" method by a factor about 3. These reductions in parasitic neutron absorptions are important because they in turn effect increases in the conversion ratio, as can be seen in Table I.

As previously stated, the preferable method of segregating the fuel units of one group from those of the other group is by the use of coated and uncoated fuel particles, such as small spheroids below about one millimeter in size. Aside from providing a simple, effective way of accomplishing the final separation of the two groups of fuel units after a reactor cycle, this manner of fuel segregation allows the units of both groups to be distributed with a fair amount of homogeneity within individual fuel elements.

The term nuclear fuel should be understood to refer to uranium and/or thorium. Also, wherever the terms uranium and thorium are used throughout this application, they should be understood to refer to these elements in elemental form or in the form of any suitable compound thereof, as for example, the oxide, carbide, nitride, etc.

Various of the features of the invention are set forth in the following claim.

What is claimed is:

A nuclear reactor utilizing a thorium-uranium[233] breeding cycle which reactor comprises a reactor core including nuclear fuel in segregated fuel units, said fuel units being spheroids having diameters less than about one millimeter, a first group of said fuel units containing uranium and a second group of said fuel units containing thorium, the fuel units of one of said groups being each coated with a protective coating of pyrolytic carbon and the fuel units of the other of said groups being uncoated.

References Cited by the Examiner
UNITED STATES PATENTS

| 2,990,348 | 6/1961 | Wollan | 176—18 |
| 3,039,945 | 6/1962 | Slack et al. | 176—45 |
| 3,151,037 | 9/1964 | Johnson et al. | 176—91 |
| 3,244,597 | 4/1966 | Tower | 176—45 |

CARL D. QUARFORTH, *Primary Examiner.*

L. DEWAYNE RUTLEDGE, *Examiner.*

H. E. BEHREND, *Assistant Examiner.*